Patented Sept. 29, 1953

2,653,987

UNITED STATES PATENT OFFICE 2,653,987

POROUS MATERIAL USEFUL IN BATTERY SEPARATORS

Joseph A. Baty, Weston, Ohio, assignor to Cresset Research Corporation, Weston, Ohio, a corporation of Ohio Application August 24, 1949, Serial No. 112,109

31 Claims. (Cl. 136—146)

This invention relates to porous material and more particularly to microporous battery separators, and the production thereof.

A battery separator is positioned between a positive and a negative plate in a storage battery cell for the purpose of preventing electrical conduction between the plates while freely permitting electrolytic conduction, i. e., the transfer of electrons by means of ions. The separator is an electrical insulator per se, but it is porous so as to permit electrolytic conduction when it is immersed in storage battery electrolyte. In order to save space, it is preferable to make the separator as thin as is consistent with adequate strength and insulating properties. Such a separator must be sufficiently resilient to withstand vibration and sufficiently strong to stand the ordinary wear and tear of regular use. It must be highly resistant to chemical and electrolytic action.

The porosity (i. e., per cent voids) and the size of the pores of a battery separator are very critical, in that the separator must be highly porous and very readily permeated by storage battery electrolyte so as to afford the minimum resistance to electrolytic conduction, but the pores of the separator must be of such size that the separator is highly efficient as a means for allowing electrolytic conduction while preventing passage of fine particles through its pores. Various materials have been suggested for use in the production of a battery separator, but heretofore none has been considered wholly satisfactory.

At first, battery separators were made out of certain kinds of wood, such as Port Orford cedar treated with an alkali, for example. Such wood possessed satisfactory pore size; but it was not satisfactory for industrial use because of certain other inherent properties such as extreme fragility, poor acid resistance and loss of porosity at low temperatures.

One well-known commercially available material which is inexpensive, resilient, non-conducting and acid-resistant is hard rubber. It has been suggested that a perforated rubber sheet having continuous openings might be used in the production of battery separators, but such a sheet is wanting either in the strength or in the porosity required of a separator. Only a sheet of very high rubber content could be used without additional support to strengthen it. Such a sheet is particularly unsatisfactory, since the porosity of the sheet and the size of the pores depend entirely upon the perforations in the sheet, and such perforations are of appreciable size and have a tendency to allow migration of the particles which separate from the battery plates. Also the perforations tend to become plugged with sediment or solid particles and thereby decrease the porosity of the sheet as well as its efficiency.

Another acid-resistant, non-conducting material is silica. It is well-known that the addition of acid to a dilute aqueous alkali silicate solution liberates silica, usually in a very fine state of dispersion, as a silica sol. The liquid silica sol may be converted quite readily, for example by complete neutralization, to a solid silica gel, which in turn may be dried to the aerogel form. As used herein the terms "silica gel" and "gel" mean any porous, solid siliceous product such as that obtained by neutralizing a solution of an alkali silicate, and the terms "hydrogel" and "aerogel" mean respectively the hydrous and the dried forms of a silica gel. A hydrogel when dried to form an aerogel yields ordinarily a material that is relatively brittle but has a structure consisting of a system of fine pores in a solid phase. Usually the dimensions of these pores can be established only by their behavior, because they are ultramicroscopic. Certain pore sizes are ideally adapted for the particular function required of a battery separator. The exact character of the pore system of a particular gel is dependent essentially upon the conditions of gel formation. Factors affecting gel formation include the speed of gelation, the temperature at which gelation takes place, the amount of agitation during gelation and the purity of the ingredients involved; but by far the most important factor is understood to be the concentration of silica, or silica-to-water ratio. For example, the amount of water in the system with the colloidal silica sol at the time of gelation determines to a very great extent the basic structural arrangement of the solid phase then produced, and a gel formed from a solution having a given silica-to-water ratio is known to be different from a gel formed from a solution having a lower silica-to-water ratio and then dehydrated to obtain the given silica-to-water ratio. Although the formation of an aerogel involves the phenomenon of syneresis as well as drying shrinkage, it is generally recognized that the most porous aerogels are those formed from hydrogels having the lowest silica-to-water ratio, i. e., the most hydrous gels.

As a method of obtaining a battery separator having certain of the desirable physical properties of rubber as well as the required porosity, it has been suggested that it might be possible to prepare a rubber binder having particles of a highly porous silica gel dispersed throughout interconnecting voids in the binder. At first it was thought that such a material might be prepared simply by working particles of the aerogel from a highly hydrous hydrogel into rubber in a normal rubber compounding process, but it was found that this method was inadequate because of the extreme difficulty not only in obtaining continuous or interconnecting pores but also in obtaining what was considered a sufficient amount of porosity or voids throughout the rubber.

Other methods have been suggested as improved methods for accomplishing the desired result—one employing a certain type of hydrogel and the other employing a certain type of rubber composition; both of these methods were considered substantial improvements not only because they afforded a means of obtaining an overall porosity much greater than that obtainable using an aerogel but also because they permitted a substantial saving in the amount of silica ($SiO_2$) required to obtain high porosity. Both of these methods involved the use of a continuous rubber phase, and the theories of both were based on the assumption that continuous or interconnecting pores in the rubber phase would result if a sufficiently great overall porosity in a material were obtained.

United States Patent No. 2,329,322 discloses a process whereby a highly porous rubber material is obtained by incorporating in the rubber (using conventional rubber machinery) a partially dehydrated friable hydrogel and then vulcanizing the rubber mass under non-evaporative conditions. The hydrogel is dehydrated sufficiently to obtain a gel that is solid enough to be forced into the rubber by, for example, a milling process. The vulcanization is carried out under non-evaporative conditions so that if anything hydration, not dehydration, of the gel takes place while the rubber is hardened. By this method, a hydrous silica gel is incorporated in the rubber so that upon subsequent drying a substantial number of voids are created in the rubber. Although this method provides very high porosity, it leaves much to be desired in that there are certain operational difficulties in the process. For example, only hydrous silica gels of a certain limited water content have a consistency such that they are suitable for use in conventional rubber machinery; the preparation of such "dehydrated" hydrogels requires additional equipment and careful control; and the vulcanizing of the rubber is carried out under non-evaporative conditions.

United States Patent No. 2,302,833 discloses a process whereby a highly porous rubber material is obtained by incorporating a hydrous silica gel in a rubber latex which is subsequently set by curing the rubber. Since a rubber latex is used, there is no problem of obtaining a (dehydrated) hydrogel solid enough to be forced into the rubber. A very hydrous silica gel is used, and such gel may be prepared in situ within the body of the latex. Stirring or agitation of the latex is carried out during the gel formation in order to obtain maximum dispersion of the hydrogel particles, which it is alleged results ultimately in a "molecular dispersion" of the gel in the rubber. By this method a highly hydrous silica gel is intimately dispersed throughout the rubber so that a great number of minute pockets containing the hydrogel are created in the rubber, which is coagulated. During the subsequent drying of the coagulated rubber product, the hydrogel particles in each of the minute pockets undergo syneresis and drying shrinkage, whereupon each of the pockets which was filled with a hydrogel becomes a void having a relatively small portion of its volume occupied by the resultant aerogel. Although this process may result in a high porosity and a minimum silica content in the final product, the product has other properties which leave much to be desired. Since such product consists essentially of a continuous phase of rubber having therein a substantial quantity of voids and only a relatively small quantity of silica, no strength can be furnished to the rubber phase by the silica. Moreover, whatever continuous porosity that may be obtained in this process must be obtained through the interconnection of the voids, and such voids are much greater in size than the optimum pore size for use in battery separators.

In spite of the difficulties involved in its industrial use, silica gel has several properties which might be used advantageously in the manufacture of articles of commerce. An aerogel has an extremely large surface area and very good heat resistance. Also, an aerogel has certain properties which are particularly desirable in battery separators—namely continuous microporosity (actually ultra-microscopic porosity) and high tensile strength. Heretofore, no one has been able to take advantage of these very desirable properties in the manufacture of a commercial battery separator, presumably because of certain well-known undesirable properties of silica gel such as the tendency to shrink excessively and crack on drying and the extreme brittleness of the resulting aerogel.

The principal object of the invention is the preparation of a greatly improved porous material which contains silica gel.

Another object of the invention is the preparation of an improved battery separator which contains silica gel.

A further object is the preparation of an improved battery separator which is strengthened by silica gel contained therein.

Still another object is the preparation of an improved battery separator which contains silica gel, having continuous microporosity. More specific objects and advantages are apparent from the description in which reference is had to the accompanying drawing.

Fig. 1 of the drawing is a triangular graph showing the proportions of ingredients used in the practice of the invention when a low filter-to-binder ratio is employed.

Figure 2 is a triangular graph showing the proportions of ingredients used when a high filler-to-binder ratio is employed.

These specific drawings and the specific description which follows merely disclose and illustrate and are not intended to limit the scope of the invention.

According to the invention a material useful in battery separators and having great strength and excellent continuous microporosity may be prepared from a plastic binder-in-water latex by a process that comprises the step of forming a homogeneous hydrogel of high silica content in the aqueous phase of the latex.

The present invention is based on the fundamental discovery that a material of unusually valuable properties is obtained by the preparation of a (concentrated) hydrogel of high silica content instead of a (dilute) hydrogel of low silica content. By the formation of a concentrated hydrogel in the water phase of a plastic binder-in-water latex, a silica gel of such strength is formed that a continuous hydrogel phase may be maintained during curing of the binder and a continuous aerogel phase may be obtained by subsequent drying. The binder is intimately incorporated in the silica gel phase, possibly contributing to the structure of the gel, and if it is present in sufficient quantity the binder itself may form a second continuous phase in intimate contact with the silica gel phase.

The plastic binder-in-water latex may be any one of a number of commercially available water emulsions of water-insoluble, acid-resistant, hardenable organic plastic materials. Such materials are usually referred to as binders in that they form the binding, cohesive element of plastic materials, forming the shape of the material and furnishing the matrix in which are held such other additives as modifiers and fillers. Such plastic binders include the heat-softenable organic plastic materials such as natural and synthetic rubbers, plasticized and unplasticized polystyrenes, polyacrylates, polyvinylidenes and polyvinyl chlorides and natural plastic materials such as tar, pitch and asphalt. It is well known in the art of making battery separators that an acid-resistant binder should be used. In some instances it may be preferable to use rubber as a binder; but the use of rubber involves the addition of curatives, accurate control of the acidity of the latex and subsequent vulcanization of the product. In the practice of the instant invention the preferred binder is polystyrene, which is readily available, inexpensive, and readily "cured" simply by elevating the temperature for a few minutes to set the resin. Also, cured polystyrene does not have a "grain," such as that of calendered rubber products. Ordinarily, any commercial latex of a binder suitable for use may be employed in the instant invention. Such a latex may have a solids content in the range from about 20 to about 70 per cent of the latex. As used herein, the terms "per cent" and "parts" means per cent and parts by weight unless otherwise designated. The preferred polystyrene latex contains about 40 per cent solids.

As hereinbefore mentioned the plastic binder may or may not be plasticized. One of the functions of a plasticizer is to soften the plastic so that the emulsified particles in the latex will adhere to one another upon drying. In the preferred procedure, employing a polystyrene latex, it has been found that very good results are obtained if a commercial polystyrene plasticizer is incorporated in the latex in the usual amount, i. e., about one part of plasticizer with from one to two parts of the latex. One type of plasticizer which has been found to be particularly useful with a polystyrene latex in the practice of the invention is referred to hereinafter as "Plasticizer No. 1 (60% solids)"; this plasticizer is understood to be composed of 40 parts of an asphaltic extender for the polystyrene which is sold under the name "Hard Stanolite (140° M. P.)," 35 parts of a mixture of methylnaphthalenes sold under the name "Indocene-90," 5 parts of a monoester of "Polyethylene Glycol 600" and a high molecular weight fatty acid (as an emulsifying agent) sold under the name "Cresset-600," and 53 parts of water. Standard ester-type plasticizers are also useful in the invention, but are less desirable for economic reasons.

The art does not have a complete understanding of the peculiarities of the behavior of silica sols and gels. In general, it is reasonable to assume that certain of the phenomena involved are the result of a tendency on the part of very small particles of colloidal silica sols (which are believed to be needle-like particles) to gather together into clusters or masses until finally they become large enough and sufficiently immobile to produce first a viscous liquid sol and then a solid hydrogel structure. It has been found that the most orderly and the strongest hydrogel structural arrangement is that of a "homogeneous" hydrogel, and this occurs when the transition from sol to gel is sufficiently gradual so that the system from which the gel forms is homogeneous. In other words, the most orderly and the strongest hydrogel structural arrangement occurs when the transition from sol to gel is so gradual that the growth of the sol clusters is more or less uniform throughout the system. By means of a gradual and uniform transition it is possible to obtain the most advantageous arrangement of the needle-like silica sol particles during the growth of the sol clusters, and ultimately to produce a homogeneous gel structure—the gradual and uniform transition from sol to gel resulting in a homogeneous sol system from which a homogeneous gel is formed. For example, if conditions are so chosen that the transition is immediate, no homogeneous gel can be had, but if the reaction rate can be reduced, as by cooling, an equivalent solution may yield a uniform translucent gel including the whole mass of the solution. Since one of the objects of the present invention is to obtain a gel structure of maximum strength, it is very desirable that the hydrogel of high silica content which is formed in the aqueous phase of the latex be homogeneous (or at least substantially so, perfect homogeneity being considered a practical impossibility).

Extending a portion of a hydrogel beyond its elastic limit results in cracking of the hydrogel. (In fact, it is customary to break a hydrogel into small pieces, and to wash, dry and perhaps ignite it to form the anhydrous aerogel which is available commercially as a very brittle material.) As a rule, the more concentrated the hydrogel the more friable it is, but two pieces of even a very dilute freshly prepared hydrogel will not coalesce if placed together under normal conditions of temperature and pressure. Such phenomena as the impossibility of forming homogeneous gels by rapid transition from sol to gel and the failure of dilute hydrogel particles to coalesce to form a homogeneous structure indicate the complex character of the gel structure.

As hereinbefore mentioned, the prior workers in the art desired principally to obtain maximum porosity in a continuous rubber phase, and, therefore, such workers used the most dilute silica gels that could be used in the particular processes they employed. In contrast, the instant invention is based on the discovery that by the use of a concentrated hydrogel it is possible to obtain a material comprising a continuous silica gel phase which imparts substantial strength to the material and affords not only adequate overall porosity in the material but also the true continuous microporosity of silica gel itself.

Ordinarily, in the preparation of a homogeneous hydrogel, an alkaline silicate solution such as an aqueous sodium silicate is neutralized simply by stirring into it a dilute acid solution. If the acid is stirred into the solution so as to neutralize it uniformly and if the resulting gel formation is not too rapid, a homogeneous gel may be obtained. In order to obtain maximum strength from a concentrated hydrogel, it has been found that the hydrogel must be homogeneous. However, the higher the concentration of the hydrogel at the time of formation the more rapid is the gel formation, and hence the more difficult it is to form a homogeneous gel. Thus the concentration of a homogeneous hydrogel which can be formed simply by neutralizing a sodium silicate solution is limited by such factors as the rate of mixing of the acid solution into the silicate solution. For example, the preparation of about the most concentrated homogeneous hydrogel that it is possible to prepare by simple neutralization of a sodium silicate solution under ordinary laboratory conditions may be demonstrated as follows:

A sodium silicate solution is prepared by diluting 50 grams of N-brand sodium silicate (an aqueous solution containing 8.9 per cent $Na_2O$ and 28.7 per cent $SiO_2$, and having a gravity of 41° Baumé) with 50 grams of water. The silicate solution is then neutralized by the addition at room temperature, with rapid stirring, of 100 grams of 7 per cent aqueous sulfuric acid. Almost instantly (in about 0.5 second) the gel formation causes the solution to stiffen and the stirring must be discontinued; however, the resulting product is a translucent, homogeneous hydrogel having a $SiO_2:H_2O$ ratio of about 1:12. If the hydrogel so formed is dried to obtain the corresponding aerogel, the material shrinks substantially and cracks to yield a product that is a brittle porous material which has crumbled to a granular, sand-like form.

One of the basic aspects of the present invention resides in the fact that a homogeneous concentrated hydrogel may be employed in the preparation of a product of superior strength comprising a continuous silica gel phase which furnishes strength to the product. In the preparation of such a product from an alkaline silicate solution containing no appreciable quantity of additions, it is usually necessary to employ a solution wherein the $SiO_2:H_2O$ ratio is at least 1:4. As is pointed out in the foregoing paragraph a homogeneous hydrogel of such a concentration cannot be prepared by an ordinary neutralization procedure. In order to prepare a homogeneous hydrogel that is sufficiently concentrated for the purpose of the instant invention (i. e., has a $SiO_2:H_2O$ ratio of at least 1:4) it is necessary to employ methods of preparing the gel which permit a transition from sol to gel that is more gradual than that obtained using ordinary neutralization. One method of controlling the rate of gel formation which may be used in the practice of the invention involves the use of either less acid than required for neutralization or more acid than required. In either case, the rate of gelation may be controlled so as to obtain a homogeneous concentrated gel; and the gel, once formed, may be completely neutralized by other methods or left unchanged, depending on the product which is to be made from it.

Another method which has been found to yield a particularly hard, tough product may be called a "diffusion" process, whereby an acid is permitted to diffuse into a soluble silicate solution. For example, the acid solution may be separated from the silicate solution by a membrane of a material such as paper and the acid permitted to diffuse through the paper, thereby accomplishing a slow but uniform neutralization throughout the gel. The hydrogel itself may be used as a membrane, for example, in a process which involves the formation of an article using unneutralized or partially neutralized sodium silicate solution and subsequent immersion of the article in acid solution, whereby the acid quickly causes the formation of a skin of hydrogel on the article and then diffuses through the skin into the semigelled article and forms a solid gel "in situ" by neutralization of the article. One advantage of this process resides in the fact that it is possible to concentrate the sodium silicate solution by partial dehydration (e. g., by evaporation) of the article before neutralization to form the solid gel, and thereby to obtain a homogeneous gel of extremely high silica content.

Still another method of forming a homogeneous highly concentrated hydrogel involves the simultaneous spraying upon a supporting material such as glass fibers of an acid and a sodium silicate solution. Other methods involve the addition to a concentrated sodium silicate solution of a material which releases an acid but which has a "delayed-action," such as a difficultly soluble acid (e. g., boric acid), a filler material impregnated with a slowly releasable acid, or a material which decomposes upon standing to yield an acid.

Each of the foregoing methods involves control of the rate of neutralization which in turn controls the rate of gel formation. Other methods may be used which involve factors which control the rate of gel formation independently of the rate of neutralization. Such methods include the use of fillers and surface active agents which may delay gel formation to such an extent that a homogeneous gel is formed or which may participate in the formation of or become a part of the gel structure so as to modify the properties of the final gelled product.

According to the present invention a material particularly useful in the preparation of battery separators and having great strength and excellent continuous porosity may be prepared from the plastic binder-in-water latex hereinbefore described by a process that comprises the step of forming a homogeneous concentrated hydrogel in the aqueous phase of the latex. It is to be understood that any one of the aforementioned methods of obtaining a homogeneous hydrogel may be used in the practice of the invention, but for the particular purposes of the invention it has been found to be preferable to prepare a concentrated solution of a water soluble silicate in the water phase of the latex and then treat the latex to form the homogeneous hydrogel therein.

Any water-soluble silicate may be used in the formation of the concentrated silicate solution, since the essential function of the water-soluble silicate is to furnish a means (i. e., the alkalinity) so that the solution may contain a sufficient concentration of $SiO_2$, which by neutralization can be converted to a gel. The salts which result from neutralization may be removed from the gel by washing. The alkali metal silicates are, of course, the most commonly used commercially, and sodium silicate solutions are available at low prices in various concentrations to suit the user and are, therefore, preferred. The particular sodium silicate solution which has been found well adapted for use in the invention is known commercially as "N-brand."

The character of the preferred procedure and the product obtained thereby in the practice of the invention may be demonstrated as follows:

A latex comprising a plastic binder-in-aqueous sodium silicate solution is prepared by thoroughly admixing 5400 parts of a standard commercial polystyrene-in-water latex (40 per cent solids), 3000 parts of Plasticizer No. 1 (hereinbefore described), 3000 parts of wood flour filler, 200 parts of ground glass fibers and 30,000 parts of N-brand sodium silicate solution. The latex (8 grams) so prepared is applied to a glass fiber mat (about ⅛ gram) which is 6 inches wide, 5 inches long and 0.008 inch thick, and the latex adheres to the mat. The latex-coated mat is then immersed in a 20 per cent aqueous ammonium sulfate solution until the latex has "set" or hardened. The mat containing the hardened latex is then washed with water to remove residual salts and dried in air at 150-200° C. for 2-3 minutes. The plastic binder is cured during the drying step.

Although certain advantages of the invention must be determined by testing the product, certain other advantages are apparent from the description of the foregoing preferred procedure. For example, it can be seen that the curing of the plastic binder is accomplished simply by raising the temperature and without the complications of a procedure such as vulcanization. Even more important, the curing does not need to be carried out under non-evaporative conditions, and this advantage is particularly significant in that it permits much greater versatility in the instant process. For example, the facts that non-evaporative conditions are not required, and that there is not an appreciable change in the size and shape of the latex-impregnated mat during the final hardening and drying, permit the preparation of an incompletely dried battery separator material (i. e., a material which contains a continuous hydrogel phase), which may be incorporated in the battery as such without further treatment.

Another advantage that can be seen readily involves the fact that the principal continuous phase in the instant invention is silica gel, which gives good adherence to glass, thereby permitting the separator to be substantially strengthened by the use of ground glass fiber filler as well as the glass fiber supporting mat. Heretofore it was not possible to obtain these added benefits in strength because the principal phase was a plastic material such as rubber, which is well known not to adhere to glass fibers. In fact, one of the preferred embodiments of the instant invention is based upon the discovery that the latex may be applied to a supporting material comprising essentially glass fibers, and then set and cured to obtain a product having very great strength as well as the other properties required of a battery separator. Because of the lack of appreciable change in size and shape during the setting and curing processes, it is possible to apply a thin coating of the latex to, for example, just one side or surface of the supporting material and to obtain a thin skin of the hardened material (having the required porosity) attached to the supporting material. The supporting material may comprise acid resisting materials other than glass fibers, and it may be in the form of a fabric instead of a mat.

Although it is preferable to use a supporting material such as glass fibers which may be incorporated in the final product to enhance its properties, it is not necessary in the preparation of a battery separator of the invention. The industry demands as thin a battery separator as possible, and the latex of the instant invention may be cast into sheets of hardened material suitable for commercial use having a thickness ranging from that of the commercially available separators (i. e., about 25-40 thousandths of an inch) to the minimum thickness at which adequate strength is obtained (i. e., about 15-20 thousandths of an inch). It is desirable, however, that some sort of mold or support be used to serve as a form for the latex before it is set; and, as hereinbefore mentioned, in the preferred procedure the latex is mounted on a support consisting of a glass fiber mat.

In the preferred procedure, the latex may be applied as a coating to only one side of the mat, or the entire mat may be impregnated. Any of the customary methods of applying the latex may be employed, and those found to be particularly satisfactory include spreading or brushing the latex on the mat, spraying the mat with the latex (and perhaps simultaneously with an acid solution), dipping the mat in the latex, and impregnating the mat with the latex in a "frictioning" process. In any of these methods the latex is applied in a quantity at least sufficient to form a continuous layer or film of the latex itself, in order to be certain that there are no openings in the continuous pore structure of the final product, and several coatings may be necessary. In fact, several thin coatings are found to impart strength unexpectedly greater than one thick coating imparts.

It is generally understood that a battery separator in order to have adequate porosity must have a minimum overall porosity or per cent voids of about 50 per cent (by volume), the maximum per cent voids being limited only by the other properties (such as strength) which are also required. By the incorporation of a silica aerogel, in the form of hard vitreous particles, in a rubber matrix it was not possible to obtain more than 30 per cent voids. By the incorporation of a partially dehydrated friable hydrogel in a rubber matrix it was possible to obtain 55-60 per cent voids. The present invention is adapted to the preparation of a dried material comprising a continuous silica gel phase and having a percentage of voids ranging from about 50 per cent to about 75 per cent; and the product obtained in the foregoing preferred procedure, which has what is now believed to be the optimum combination of properties, has 67±2 per cent voids.

The overall per cent voids is not determinative but merely indicative of the suitability of a material for use as a battery separator. Another very important factor is the actual pore size. If the pores are very large, then particles may enter the separator and block up a substantial portion of the pores or perhaps group together to form a bridge or means of reducing the electric (as contrasted to electrolytic) insulating properties. The best indication of the adequacy of the porosity is the permeability of the material. In other words, if one material is less permeable (i. e., permits a liquid such as water to flow through it less rapidly) than another material having the same per cent voids, it is clear that the openings or pores of the former are smaller than the latter. As a general rule in the battery separator industry, the smaller the pores the better the product. Alkali-treated cedarwood, for example, has very fine pores and is, therefore, considered ideal in respect to the property of pore size. The product obtained in the foregoing preferred procedure has a permeability approaching that of wood; and, in contrast, material obtained by the incorporation of partially dehydrated hydrogel, for example, in a rubber matrix permits water to flow through it about ten times as rapidly as does the product of the invention.

The much lower permeability of the product of the invention proves the existence of the continuous silica gel phase which, being so dispersed in the product, imparts to the whole product the very fine continuous microporosity of silica gel itself, as contrasted with the character of porosity which can be obtained through the creation of voids by incorporating silica gel particles in a plastic binder matrix.

The fact that the resulting product comprises essentially a continuous silica gel phase which contributes substantially to its strength may be demonstrated strikingly by treating the product with an agent which dissolves silica gel, such as hydrofluoric acid or warm sodium hydroxide. The product disintegrates under such a treatment, whereas a product comprising essentially a continuous rubber phase (or other plastic phase which is resistant to the agent used for dissolving the silica gel) is merely made more flexible.

Other acid materials, for example, sulfuric acid or sodium acid sulphate may be used successfully in the foregoing process, but ammonium sulfate has been found to give the best results not only because it is easier to work with than sulfuric acid but also because it is believed to have a desirable effect as a surface active agent for the silica gel. In the foregoing preferred procedure, the neutralizing agent used may be a quick-acting agent, such as ammonium sulfate, because the rate of neutralization is sufficiently slowed by the presence of the filler and the binder in the latex, and particularly by the semi-diffusion process which takes place. As soon as the latex-impregnated mat is dipped into the ammonium sulfate solution a skin comprising essentially a hydrogel is formed on the surface of the latex, and the ammonium sulfate must then diffuse through this skin to complete the neutralization of the latex.

The essential ingredients in the latex of the invention are a plastic binder, $SiO_2$ and water; and one aspect of the present invention resides in the discovery of the unique cooperation between these ingredients, when used in certain proportions in the practice of the invention, whereby it is possible to obtain the unusually useful products of the invention. Essentially the invention involves a modification of silica gel so that such desirable properties as the strength and continuous porosity of the gel may be taken advantage of commercially.

It is known that a silica hydrogel containing 300 mols of water for each mol of silica may be formed; but during dehydration of any silica hydrogel the shrinkage and loss of water proceed continuously until a $SiO_2$ concentration of about 55 to 70 per cent is reached, after which dehydration proceeds with practically no further shrinkage. One of the basic discoveries involved in the present invention is that it is possible to prepare a homogeneous hydrogel of high $SiO_2$ concentration (i. e., at least about 20 per cent) which does not undergo sufficient change in shape to lose its strength during subsequent dehydration but which actually has a substantially lower $SiO_2$ concentration than that at which shrinkage is known to be complete. A still more remarkable discovery in connection with the present invention is the finding that under certain conditions and in certain proportions a third ingredient, a plastic binder, may be incorporated in the $SiO_2$-$H_2O$ system so as to alter substantially the final products. For example, a concentrated hydrogel of given $SiO_2$ content may be dehydrated to form a continuous aerogel phase of given strength, whereas a hydrogel of the same $SiO_2$ content when formed in the aqueous phase of the latex of the invention may be dehydrated to form a product of substantially greater strength which, like the former product, also comprises essentially a continuous aerogel phase. Also, the latter product has a resiliency greater than that obtainable from an unmodified hydrogel. The foregoing facts indicate that the binder actually participates in the formation of and forms certain key links in the silica gel structure.

It is believed that a plastic binder, being dispersed in the latex as a colloid-like material, participates to the greatest extent in the formation of the gel structure, but it appears that fillers which are incorporated in the latex participate in a similar manner. Although the wood flour filler used in the foregoing preferred procedure may be omitted entirely in the practice of the invention, it has been found preferable to use some filler in many instances. For example, wood flour has been found to impart added resistance to cracking. Other fillers such as barytes, ground silica, diatomaceous earth and commercial "aerogel" powder may be used effectively. Ground glass fibers have been found to impart unusual added strength; and it is, therefore, preferable to use them at least in small amounts (i. e., 5-10 per cent of the filler), so that the benefit of the strength can be had without an appreciable deleterious effect upon the uniformity of the product. Porous fillers such as wood flour may impart added porosity to the product, but the continuous silica gel phase has been found to have fully adequate porosity.

In the preparation of the battery separators of the invention it has been found that a filler-to-binder ratio of as much as 3 to 1 may be used without substantial loss of certain of the desirable properties such as resiliency of the final product. Ordinarily it is preferable to use only about 1 to 10 parts of the filler for every 10 parts of the binder. Although the use of a high filler-to-binder ratio (i. e., at least about 1:1) results in low cost products having satisfactory properties, it has been found that the use of a low filler-to-binder ratio (i. e., less than about 1:1) results in products having superior properties.

Figure 1:
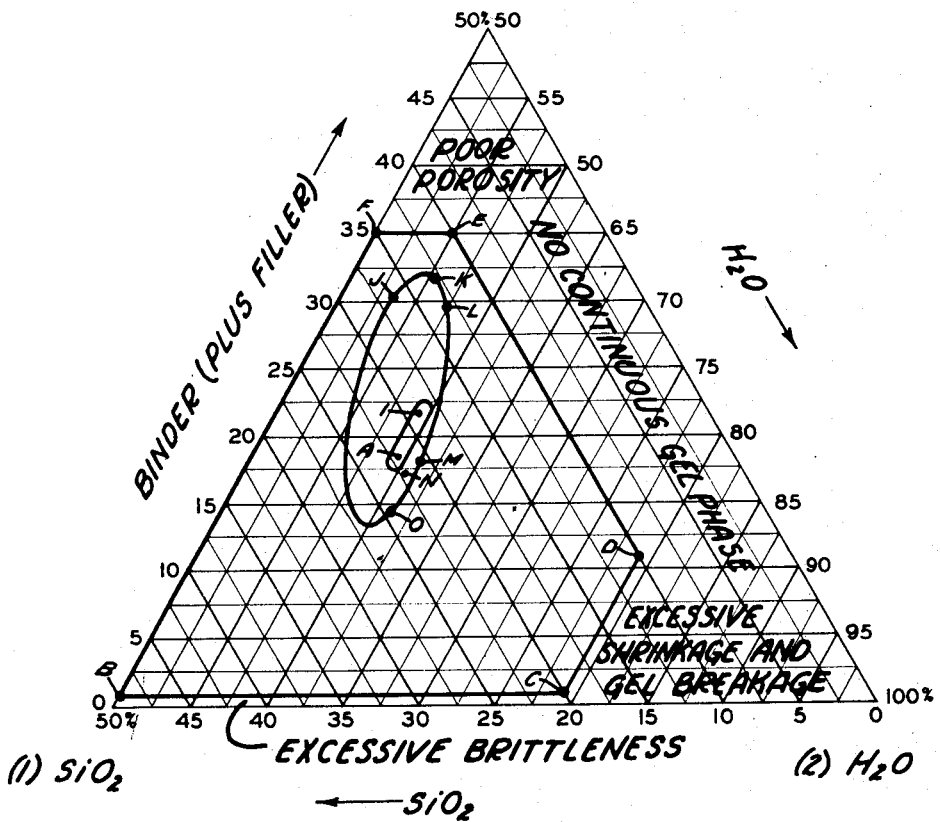
Fig. 1 represents a portion of a triangular graph showing areas which cover the operable, preferred and optimum combinations, using a low filler-to-binder ratio, of the three essential ingredients used in the practice of the invention.

Although the filler and the binder are different substances, it has been found that over certain ranges of filler-to-binder ratios their functions are apparently quite similar in most respects. Accordingly, it has been possible to determine a definite relationship at a low filler-to-binder ratio (Fig. 1) and a definite relationship at a high filler-to-binder ratio (Fig. 2) between the following three essential ingredients—(1) $SiO_2$, (2) $H_2O$ and (3) binder (plus filler), wherein the third ingredient is the total amount of the plasticized or unplasticized binder and of the filler which is used.

In the drawings, the percentages (by weight) of these three ingredients are plotted; and the method of calculating these percentages may be demonstrated by reference to Table 1 below wherein there are tabulated the particular materials employed in preparing a latex (column 1), the approximate amount of $SiO_2$ contained in such materials (column 2), the approximate amount of $H_2O$ contained in such materials (column 3), and the approximate amount of binder (solid plasticized material) and filler contained in such materials (column 4). At the bottom of Table 1 there are tabulated the total amount (line 6) and the total percentage (line 7) of each of the three essential ingredients.

Table 1

| col. 1 Material | col. 2 $SiO_2$ | col. 3 $H_2O$ | col. 4 binder (plus filler) |
|---|---|---|---|
| 1. Polystyrene latex (40% solids) | | 3,240 | 2,160 |
| 2. Plasticizer No. 1 (60% solids) | | 1,200 | 1,800 |
| 3. N-Brand Sodium Silicate | 8,610 | 18,720 | |
| 4. Wood Flour | | | 3,000 |
| 5. Ground Glass Fibers | | | 200 |
| 6. Total | 8,610 | 23,160 | 7,160 |
| 7. Percent | 22.2 | 59.4 | 18.4 |

Referring to Figure 1, the point A at the composition: 22.2% $SiO_2$, 59.4% $H_2O$ and 18.4% binder (plus filler) designates the most preferred percentage composition of the product of the invention. The area covering the operable percentage compositions of the invention is of substantial size, thus showing the extreme flexibility of the invention; but this area has quite definite boundaries which are determined by the requirements of certain properties in battery separators. For example, one of the essential requirements of the battery separator of the invention is that it have at least an appreciable superiority in shock resistance and flexibility to pure silica gel, and, therefore, the minimum amount of binder (with or without a filler) which may be present in the composition is the least amount (i. e., about 1 per cent) which brings about an appreciable improvement in such properties. On the other hand, when the minimum amount of binder is employed, the amount of $SiO_2$ may range from the point B which represents the maximum amount (i. e., about 50 per cent) of $SiO_2$ that can be used to obtain the minimum required porosity (i. e., about 50 per cent by volume of voids) to point C which represents the minimum amount (i. e., about 20 per cent) of $SiO_2$ that can be used to obtain a silica hydrogel which is sufficiently concentrated for the purposes of the invention (i. e., has at least a $SiO_2:H_2O$ ratio of 1:4).

Referring again to the point C, representing the minimum percentage of $SiO_2$ that can be used when the minimum percentage of binder is used, it has been found that as the amount of binder (plus filler) is increased the amount of $SiO_2$ may be correspondingly decreased (without appreciably changing the percentage of $H_2O$) down to the point D of about 10 per cent $SiO_2$ without obtaining a hydrogel (in the aqueous phase of the latex) that is so dilute that it shrinks and cracks during drying. The minimum $SiO_2$ percentages are also determined by the fact that a substantial proportion of $SiO_2$ must be present in order to obtain a phase which is, in fact, a continuous silica gel phase. Accordingly, it has been found that about 10 per cent $SiO_2$ is the minimum percentage of $SiO_2$ that can be used to obtain a composition containing a strong continuous silica gel phase, although the percentage of the binder (plus filler) may be increased up to the point E of about 35 per cent binder plus filler at which point the presence of such a substantial quantity of binder (plus filler) appears to interfere with the continuous porosity of the silica gel and, in some cases, appears to impart too great an amount of resiliency to the material.

At the maximum percentage of binder (plus filler) in the composition, the percentage of $SiO_2$ may be increased from the point E of its minimum percentage in the composition to the point F of about 15 per cent so as to improve somewhat the pore structure of the composition, but it is not possible to increase the per cent $SiO_2$ past the point F of about 15 per cent without decreasing the per cent binder (plus filler) correspondingly in order to prevent the total amount of binder (plus filler) and $SiO_2$ from being so great that it is impossible to obtain 50 per cent (by volume) total porosity or voids in the final dried composition.

As has been mentioned, it has been found that the incorporation of such materials as a binder or a filler has a tendency to retard or prevent shrinkage of the hydrogel during drying. The functions of a binder and a filler are quite similar in this respect; but the effect of a filler, such as wood flour, is ordinarily much more noticeable than that of a binder at low $SiO_2$ concentrations. Because of this fact the relationship between the three essential ingredients that is obtained by the use of a low filler-to-binder ratio is different from that obtained by the use of a high filler-to-binder ratio, at least in respect to the minimum $SiO_2$ percentages that can be employed, as shown in Figure 2.

Figure 2:
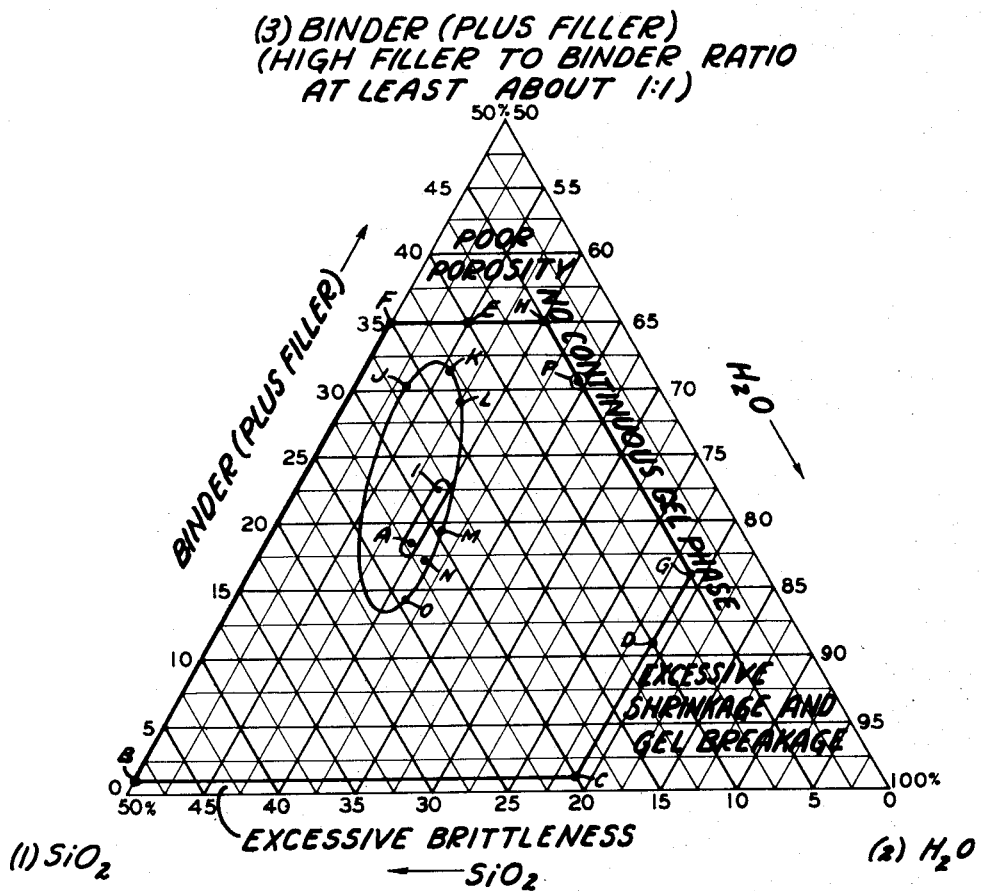
Fig. 2 represents a portion of a triangular graph showing areas which cover the operable, preferred and optimum combinations, using a high filler-to-binder ratio, of the three essential ingredients used in the practice of the invention.

Referring to Figure 2 (which shows the area covering the operable combinations of the three ingredients when the filler-to-binder ratio is high), it can be seen that the minimum and maximum percentages of $H_2O$ that may be used are the same as the percentages that may be used with a low filler-to-binder ratio. Also, the minimum and maximum percentages of binder (plus filler) that may be used are the same as the percentages that may be used with a low filler-to-binder ratio. However, the minimum percentages of $SiO_2$ that may be used are different from the percentages that may be used with a low filler-to-binder ratio; in fact, it is possible to reduce the percentage of $SiO_2$ below the aforementioned minimum point D of about 10 per cent, down to a point G of about 5 per cent $SiO_2$, if the filler-to-binder ratio is at least about 1:1. The fact that a filler is more effective than a plastic binder in reducing the shrinkage is probably explained by such characteristics of the filler as rigidity, high tensile strength and fibrous structure, as contrasted to the resiliency and more or less colloidal characteristics of the plastic binder. Apparently, the amount of filler present at filler-to-binder ratios of as much as 1:1 is such that it is possible to obtain a continuous silica gel phase even though a very low percentage of $SiO_2$ is employed. In any event, the minimum $SiO_2$ percentages are determined essentially by the fact that a substantial proportion of $SiO_2$ must be present in order to obtain a phase which is, in fact, a continuous gel phase (or essentially so), no matter how much the binder or filler might contribute to the properties of the silica gel phase. Accordingly, it has been found that even at high filler-to-binder ratios, about 5 per cent $SiO_2$ is the minimum percentage of $SiO_2$ that can be used to obtain a composition containing a strong continuous silica gel phase, although the percentage of binder (plus filler) may be increased up to the point H of about 35 per cent binder (plus filler), above which point the presence of such a substantial quantity of binder (plus filler)

appears to interfere with the continuous porosity of the silica gel.

One of the unique advantages of the present invention is that it is possible to obtain a great number of desired combinations of porosity and strength, whereas in battery separator materials heretofore known it was usually possible to obtain one of the properties such as high porosity or great strength only at a substantial sacrifice in the other. Also, in accordance with the present invention it is possible to obtain materials which have substantially the same overall resistance to breakage, but which differ in their resiliency and impact resistance and even in their general appearance. In other words, a material having what is now understood to be the preferred percentage of voids (i. e., 60-70 per cent voids, at which the material has the optimum combination of porosity and industrial wearing properties) may be prepared using a very high or very low filler-to-binder ratio.

If the filler-to-binder ratio is very high (i. e., about 1:1 as in the case of the material prepared in the preferred procedure hereinbefore described) the material takes on certain of the characteristics properties of the filler itself, and may have a cork-like texture if the principal ingredient of the filler is wood flour, or a brick-like texture if the principal ingredient of the filler is a mineral filler such as ground silica or clay. Such a material has great strength and is ordinarily very rigid, although there is a certain amount of resiliency in the material because at least a substantial proportion of binder is used in conjunction with the filler in the practice of the invention. By the use of a high filler-to-binder ratio it is possible to prepare an inexpensive material, because inexpensive fillers such as wood flour and ground glass fiber may be used to replace the more expensive ingredients such as the plastic binder.

If the filler-to-binder ratio is very low (i. e., 1:4 or less) the material has less compressive strength, but has about the same industrial wearing properties because of the added resiliency of the material. The general character of such a product and its preparation may be demonstrated by carrying out the following procedure:

A latex comprising a plastic binder-in-aqueous sodium silicate solution is prepared by thoroughly admixing 3600 parts of a standard commercial polystyrene-in-water latex (40 per cent solids), 2000 parts of Plasticizer No. 1 (hereinbefore described), 860 parts of wood flour filler and 10,000 parts of N-brand sodium silicate solution. The latex (8 grams) so prepared is applied to a glass fiber mat (about ⅛ gram) which is 6 inches wide, 5 inches long and 0.008 inch thick, and the latex adheres to the mat. The latex-coated mat is then immersed in a 20 per cent aqueous ammonium sulfate solution until the latex has "set" or hardened. The mat containing the hardened latex is then washed with water to remove residual salts and dried in air at 100-120° C. for 6 minutes. The plastic binder is cured during the drying step. Washing with boiling water prior to drying has been found to be preferable in that it reduces the electrolytic resistance to a minimum in the final product. The resulting product has 62±2 per cent porosity (per cent voids) and about the same permeability as the product obtained in the foregoing preferred procedure.

In Table 2 below there are tabulated the particular materials employed in preparing the latex (column 1), the approximate amount of $SiO_2$ contained in such materials (column 2), the approximate amount of $H_2O$ contained in such materials (column 3), and the approximate amount of binder (solid plasticized material) and filler contained in such materials (column 4). At the bottom of Table 2 there are tabulated the total amount (line 5) and the total percentage (line 6) of each of the three essential ingredients.

*Table 2*

| col. 1 Material | col. 2 $SiO_2$ | col. 3 $H_2O$ | col. 4 binder (plus filler) |
|---|---|---|---|
| 1. Polystyrene latex (40% solids) | | 2,160 | 1,440 |
| 2. Plasticizer No. 1 (60% solids) | | 800 | 1,200 |
| 3. N-Brand Sodium Silicate | 2,870 | 6,240 | |
| 4. Wood Flour | | | 860 |
| 5. Total | 2,870 | 9,200 | 3,500 |
| 6. Percent | 18.4 | 59.1 | 22.5 |

Referring to Figure 1, the composition: 18.4% $SiO_2$, 59.1% $H_2O$ and 22.5% binder (plus filler) at the point I, is the composition obtained by carrying out the foregoing procedure. The $SiO_2$ content of the present composition (point I) is substantially lower than that of the most preferred composition (point A), and this chiefly accounts for the lower per cent voids the present composition. On the other hand, the present composition is appreciably more flexible than the most preferred composition and is, therefore, particularly adapted to special uses. In general, it can be said that the ellipse AI covers the compositions in which there is an optimum combination of porosity and resistance to wear and tear, i. e., the compositions which have about 59-60% $H_2O$ and about 20±3% of each of the ingredients: $SiO_2$ and binder (plus filler).

The ellipse JKLMNO designates approximately the preferred percentage compositions, i. e., those compositions which are very satisfactory as battery separator materials and may excel in a given property (e. g., resiliency) to such an extent that they may be clearly superior for some special use, although for ordinary commercial use materials having the optimum compositions (A—I) have been found to be superior.

The shape and location of the ellipse JKLMNO has been determined by experimentation to ascertain the extent to which each of the ingredients (as set forth in Table 2) may be altered in the foregoing procedure without substantially subtracting from the desired properties in the final product. For example, using as a standard the proportions of ingredients set forth in Table 2 above, and using the corresponding product as a standard for the required properties, it has been found that the amount of wood flour used may be increased by as much as about 200 per cent before there is a sufficient reduction in the percentage of water to cause an appreciable decrease in the porosity of the resulting composition (i. e., point J: 16.6% $SiO_2$, 53.2% $H_2O$ and 30.2% binder plus filler); the amount of sodium silicate solution used may be decreased about 50 per cent before there is such a decrease in the final $SiO_2$ percentage that there is a substantial decrease in the strength and porosity of the resulting composition (i. e., point K: 13.0% $SiO_2$, 55.2% $H_2O$ and 31.8% binder plus filler); and the amount of the binder and plasticizer used may be increased by as much as about 100 per cent before there is such an increase in resiliency that there is an appreciable decrease in the strength of the resulting composition (i. e., point L: 13.5% $SiO_2$, 57.4% $H_2O$ and 29.1% binder plus filler). The amount of wood flour used may be decreased about 70 per cent before the resistance to cracking is noticeably decreased in the resulting composition (i. e., point M: 19.1% $SiO_2$, 61.6% $H_2O$ and 19.3% binder plus filler); the amount of sodium silicate solution used may be increased by as much as about 50 per cent before there is a noticeable increase in the brittleness of the resulting composition (i. e., point N: 21.3% $SiO_2$, 61.3% $H_2O$ and 17.4% binder plus filler); and the amount of the binder and plasticizer used may be decreased by about 70 per cent before the resiliency is reduced so as to reduce noticeably the impact resistance of the resulting composition (i. e., point O: 24.7% $SiO_2$, 61.2% $H_2O$ and 14.1% binder plus filler). Other binder latices, plasticizers and fillers may be employed in substantially the same proportions in the preparation of preferred embodiments of the invention.

It has been found that the addition of water other than that present in the ingredients (such as the silicate solution and the latex) is permissable to a limited extent; but as a general rule better results are obtained without the addition of water. Of course, changes in gelation technique would permit a greater latitude in the preferred proportions, particularly changes affecting the speed of gelation. In fact, it is to be understood that the foregoing operable, preferred and optimum ranges are determined on the basis of the present most commercially practicable gelation techniques; and it is anticipated that substantial improvements in such techniques will permit greater porosity accompanied by strength that is about the same as that now obtainable.

The proportions of ingredients which are actually operable in the practice of the invention include all the proportions with which it is possible to obtain a continuous phase comprising essentially silica gel, such phase having the continuous porosity of silica gel and being of sufficient strength to lend support to the whole structure. A process demonstrating the use of an extreme example of such proportions to obtain a satisfactory product involves the following procedure:

A latex comprising a plastic binder-in-aqueous sodium silicate solution is prepared by thoroughly admixing 80 parts of a standard commercial polystyrene-in-water latex (40 per cent solids), 80 parts of Plasticizer No. 1 (hereinbefore described), and 100 parts of N-brand sodium silicate solution. A filler consisting of 100 parts of wood flour and 25 parts of calcium carbonate is added slowly, with stirring, to the latex. Water (500 parts) is then stirred into the latex; and the latex is neutralized by the addition, with rapid stirring, of 200 parts of an aqueous ammonium sulfate solution (containing 200 grams of ammonium sulfate per liter). The stirring is continued until the latex "sets," and then a second lot of water (500 parts) is added to the set latex and the resulting mixture is stirred until a smooth, heavy slurry is obtained. The slurry so obtained is passed through a colloid mill to obtain a very light, fluid slurry. A portion of the resulting slurry (about 8 grams) is applied to a glass fiber mat (about ⅛ gram) which is 6 inches wide, 5 inches long and 0.008 inch thick. The coated mat is passed directly into an oven to dry for a few minutes at 110–150° C. If desired, several coatings of the slurry may be applied to the glass mat in the foregoing manner, and this may be necessary in order to obtain a sheet of the final dried material which is free from small openings or "pinholes." The porosity of the material is about 60 per cent voids.

The foregoing process is particularly useful in demonstrating the versatility of the instant invention, and is unique in several respects. Certain of the steps of the foregoing process appear to be such as to prevent, not to permit, the formation of a strong continuous silica gel phase; and a study of each of such steps is particularly helpful in arriving at a more complete understanding of the instant invention.

In the foregoing procedure, such a large amount of water is present at the time when neutralization takes place that it appears that the calculated percentage of $SiO_2$ would be about 2, but actually the percentage of $SiO_2$ in the final hydrogel-binder structure is at least about 5. Several factors combine to bring about this result. The presence of a very subtantial quantity of water-retaining material such as the wood flour prevents a substantial portion of the water from entering into the initial hydrogel structure. It is known that once a hydrogel is formed subsequent additions of water to the mixture have little or no effect upon the gel structure. However, it has been found that by subjecting a hydrogel slurry to the drastic crushing action of a colloid mill, for example, it is possible to squeeze out substantial amounts of water and to effect a permanent reduction in the water content of the hydrogel; and it is believed that the most important single factor involved in obtaining a sufficiently concentrated hydrogel in the instant procedure is the colloid mill treatment of the heavy slurry. Also, the excess water is allowed to escape freely when the slurry is applied to the glass fiber mat, and only the solid portions of the slurry are retained on the mat. It is also pointed out that there is a very high filler-to-binder ratio (i. e., about 3:2) and a very high percentage of binder (plus filler) in the resulting composition (i. e., about 33%); and both of these facts (particularly the former) have been shown hereinbefore to permit the use of a low per cent $SiO_2$ without complete loss of strength. It is believed that the resulting composition lies on the graph in the area P, at approximately a composition of 5% $SiO_2$, 62% $H_2O$ and 33% binder (plus filler).

In the foregoing process the hydrogel is first set and then crushed and allowed to recombine. As hereinbefore mentioned, slow neutralization is usually the best, but certainly not the only method of obtaining homogeneity, notwithstanding the fact that two pieces of even a very dilute freshly prepared hydrogel will not coalesce when placed together under normal conditions of temperature and pressure. In the foregoing process the conditions are so altered that it is possible to recombine the particles of crushed hydrogel so as to obtain a hydrogel of sufficient homogeneity to permit the formation of a strong silica gel phase. It has been found that in the foregoing process the factors which contribute substantially to the ability of the crushed hydrogel particles to recombine are the surface active agents which are present, namely, the ammonium sulfate and the emulsifying agent in Plasticizer No. 1. For example, if sulfuric acid instead of ammonium sulfate is used to carry out the neutralization in the foregoing process a substantially weaker product is obtained. On the other hand, it is possible also to assist the welding of the hydrogel particles by the use of pressure which is applied to the mat during the coating and curing process by means of a permeable diaphragm so that water is permitted to escape.

Another aspect of the present invention resides in the fact that a particularly useful composition may be obtained if a small portion of the filler used is a compound which is inert in an alkaline medium and which releases a slightly soluble gas in a strongly acid medium. Examples of such compounds include the insoluble carbonates, the most common of which are the alkaline earth metal carbonates, and particularly calcium carbonate which has been found to be very well adapted for use in the instant invention. The particular advantage obtained by the use of calcium carbonate in the composition of the invention arises from the fact that the calcium carbonate is reacted upon by the battery electrolyte to release a substantial quantity of carbon dioxide, which sweeps the air out of the separator and prevents the blocking off of a substantial portion of the voids in the separator by entrapped air. Calcium carbonate is particularly useful for this purpose because it is not affected appreciably during the neutralization and curing processes in the preparation of the separator material, and because the calcium sulfate produced by reaction with the sulfuric acid in the battery electrolyte is insoluble and inert and does not interfere with the action of the battery plate. The amount of calcium carbonate which is used may range from the minimum theoretical amount required to displace all the air in the voids of the separator to a substantial excess (e. g., about 10 times the theoretical amount), which permits a more thorough sweeping of the air from the separator, but does not appreciably reduce the strength of the separator by the loss of a substantial portion of the filler through reaction with the electrolyte, or reduce the overall porosity of the separator by leaving an appreciable volume of its voids filled with an inert filler.

It is the applicant's understanding that the structure of a very thin section of the porous material of the invention might be compared to a thin section of an extremely fine honeycomb structure wherein the basic pattern is reasonably uniform (resulting from the homogeneous gel structure), and intimately incorporated in this basic pattern are relatively large particles of binder (and filler). The pores in the silica gel are several magnitudes smaller than a particle of polystrene latex, for example, which is of the order of one micron in diameter. Of course, if there is present a sufficient amount of a material such as the binder whose particles will weld together during curing, there is also present a continuous binder phase, intimately incorporated in the gel phase.

Various embodiments of the invention may be derived to meet various requirements.

Having described the invention, I claim:

1. A porous material comprising a silica gel phase and, intimately incorporated therein, a water-insoluble, acid-resistant, heat-softenable organic plastic binder, the weight proportions, on an undried hydrogel basis, of $SiO_2$, $H_2O$ and binder in the material falling within the area bounded by the pentagon BCDEF on the chart shown in the attached Figure 1.

2. A porous material comprising a silica gel phase and, intimately incorporated therein, a polystyrene binder, the weight proportions, on an undried hydrogel basis, of $SiO_2$, $H_2O$ and binder in the material falling within the area bounded by the pentagon BCDEF on the chart shown in the attached Figure 1.

3. A porous material comprising a silica gel phase and, intimately incorporated therein, a water-insoluble, acid resistant, heat-softenable organic plastic binder, and a filler in an amount ranging from one to three times the weight of the binder, the weight proportions, on an undried hydrogel basis, of $SiO_2$, $H_2O$ and binder plus filler in the material falling within the area bounded by the pentagon BCGHF on the chart shown in the attached Figure 2.

4. A porous material comprising a continuous silica hydrogel phase and, intimately incorporated therein, polystyrene and wood flour, in an amount ranging from one-tenth to three times the weight of the binder, the weight proportions of $SiO_2$, $H_2O$ and binder plus filler in the material falling within the area bounded by the ellipse JKLMNO on the chart shown in the attached Figure 1.

5. A porous material comprising a continuous silical aerogel phase and, intimately incorporated therein, polystyrene, wood flour and a small amount of an alkaline earth metal carbonate.

6. A microporous composition consisting of two continuous phases, one comprising essentially silica dried hydrogel and the other comprising essentially a water-insoluble, acid resistant, hardened organic plastic binder, the weight proportions, on an undried hydrogel basis, of $SiO_2$, $H_2O$ and binder in the material falling within the area bounded by the pentagon BCDEF on the chart shown in the attached Figure 1.

7. A microporous composition consisting of two continuous phases, one comprising essentially silica dried hydrogel and the other comprising essentially a water-insoluble, acid resistant, heat-softenable organic plastic binder, said phases being in intimate contact and having intimately incorporated therewith a filler in an amount ranging from one-tenth to three times the weight of the binder, and the weight proportions, on an undried hydrogel basis, of $SiO_2$, $H_2O$ and binder plus filler in the composition falling within the area bounded by the ellipse JKLMNO on the chart shown in the attached Figure 1.

8. A storage battery separator comprising a continuous silica gel phase mounted on a supporting material comprising essentially glass fibers, a water-insoluble, acid-resistant, heat-softenable organic plastic binder being intimately incorporated in the gel phase, the weight proportions, on an undried hydrogel basis, of $SiO_2$, $H_2O$ and binder in the separator falling within the area bounded by the pentagon BCDEF on the chart shown in the attached Figure 1.

9. A storage battery separator comprising a continuous silica dried hydrogel phase mounted on a supporting material comprising essentially glass fibers, a water-insoluble, acid-resistant, hardened organic plastic binder being intimately incorporated in the gel phase, the weight proportions, on an undried hydrogel basis, of $SiO_2$, $H_2O$ and binder in the separator falling within the area bounded by the pentagon BCDEF on the chart shown in the attached Figure 1.

10. A storage battery separator comprising a continuous silica hydrogel phase mounted on a supporting material comprising essentially glass fibers, a water insoluble, acid-resistant, heat softenable organic plastic binder and a filler being intimately incorporated in the gel phase, the filler being present in an amount ranging from one-tenth to three times the weight of the binder, the weight proportions of $SiO_2$, $H_2O$ and binder plus filler in the separator falling within the area bounded by the ellipse JKLMNO on the chart shown in the attached Figure 1.

11. A process of preparing a microporous body having a continuous silica phase, from a system comprising a continuous aqueous phase consisting of water having dispersed therein alkali silicate in an amount such that the $SiO_2 : H_2O$ ratio is at least 1:4, which comprises the step of controllably neutralizing the alkaline aqueous phase at a rate sufficiently slow to cause formation of a homogeneous continuous silica hydrogel phase.

12. A process of preparing a porous material that comprises the step of neutralizing the aqueous phase of a plastic binder-in-water latex whose aqueous phase comprises an aqueous alkali silicate solution, the weight proportions of $SiO_2$, $H_2O$ and binder in the latex falling within the area bounded by the pentagon BCDEF on the chart shown in the attached Figure 1, the binder being an acid-resistant, water-insoluble, organic plastic material.

13. A process as claimed in claim 12 wherein from one-tenth to one-half of the weight of the binder is replaced by a filler.

14. A process of preparing a microporous material suitable for use in a battery separator, which comprises the steps of (1) applying to a permeable supporting material a layer of a plastic binder-in-water latex whose aqueous phase comprises an aqueous alkali silicate solution, the weight proportions of $SiO_2$, $H_2O$ and binder in the latex falling within the area bounded by the ellipse JKLMNO on the chart shown in the attached Figure 1, and the plastic being a water-insoluble, acid-resistant, hardenable organic plastic material suitable for use in battery separators and being replaced by not more than 75 per cent of its weight by a filler suitable for use in battery separators and (2) bringing the layer of latex into contact with acid so as to neutralize the aqueous phase and form a hydrogel therein.

15. A porous material comprising a continuous silica dried hydrogel phase and, intimately incorporated therein, a water-insoluble, acid resistant, heat softenable organic plastic binder and a filler in an amount ranging from one-tenth to three times the weight of the binder, the weight proportions, on an undried hydrogel basis, of $SiO_2$, $H_2O$ and binder plus filler in the material falling within the area bounded by the ellipse JKLMNO on the chart shown in the attached Figure 1.

16. A porous material comprising a continuous silica dried hydrogel phase and, intimately incorporated therein, polystyrene and wood flour in an amount ranging from one-tenth to three times the weight of the binder, the weight proportion, on an undried hydrogel basis, of $SiO_2$, $H_2O$ and binder plus filler in the material falling within the area bounded by the ellipse JKLMNO on the chart shown in the attached Figure 1.

17. A storage battery separator comprising a continuous silica dried hydrogel phase mounted on a supporting material comprising essentially glass fibers, a plastic binder and a filler being intimately incorporated in the gel phase, the filler being present in an amount ranging from one-tenth to three times the weight of the binder, the weight proportion, on an undried hydrogel basis, of $SiO_2$, $H_2O$ and binder plus filler in the separator falling within the area bounded by the ellipse JKLMNO on the chart shown in the attached Figure 1.

18. A method as claimed in claim 12 wherein the proportions fall within the area bounded by the ellipse JKLMNO on the chart shown in the attached Figure 1.

19. A method as claimed in claim 18 wherein one-tenth to one-half of the weight of the binder is replaced by a filler.

20. A method as claimed in claim 19 wherein the filler comprises 5–10 weight percent of ground glass fibers and the remainder wood flour, and the binder is polystyrene.

21. A method as claimed in claim 20 wherein the aqueous phase is neutralized by contacting the latex with ammonium sulfate.

22. A method as claimed in claim 21 wherein a layer of the latex is applied to a permeable supporting material and the layer is exposed to aqueous ammonium sulfate.

23. A method as claimed in claim 22 wherein the proportions fall within the area bounded by the ellipse AI on the chart shown in the attached Figure 1.

24. A storage battery separator as claimed in claim 8 wherein the proportions fall within the area bounded by the ellipse JKLMNO on the chart shown in the attached Figure 1.

25. A separator as claimed in claim 24 wherein one-tenth to one-half of the weight of the binder is replaced by a filler.

26. A separator as claimed in claim 25 wherein the filler comprises 5–10 weight per cent of ground glass fibers and the remainder wood flour, and the binder is polystyrene.

27. A separator as claimed in claim 26 wherein the proportions fall within the area bounded by the ellipse AI on the chart shown in the attached Figure 1.

28. A separator as claimed in claim 9 wherein one-tenth to one-half of the weight of the binder is replaced by a filler that consists of 5–10 weight percent ground glass fibers, a small amount of calcium carbonate to flush air out of the pores of the separator when decomposed by the acid battery solution, and the remainder wood flour.

29. A composition as claimed in claim 15 wherein the proportions fall within the area bounded by the ellipse AI on the chart shown in the attached Figure 1.

30. A composition as claimed in claim 29 wherein the binder is polystyrene and the filler is wood flour.

31. A composition as claimed in claim 30 wherein 5–10 weight percent of the wood flour filler is replaced by ground glass fibers.

JOSEPH A. BATY.

References Cited in the file of this patent

UNITED STATES PATENTS

| Number | Name | Date |
|---|---|---|
| 2,176,427 | Kershaw | Oct. 17, 1939 |
| 2,181,299 | Burgess | Nov. 28, 1939 |
| 2,302,832 | Behrman | Nov. 24, 1942 |
| 2,302,833 | Behrman | Nov. 24, 1942 |
| 2,329,322 | Baty et al. | Sept. 14, 1943 |

FOREIGN PATENTS

| Number | Country | Date |
|---|---|---|
| 537,377 | Great Britain | June 19, 1941 |